United States Patent [19]

Cisar et al.

[11] 4,454,082

[45] Jun. 12, 1984

[54] METHOD AND APPARATUS FOR MONITORING THE THICKNESS OF A FOAMED EXTRUDATE IN AN ENVIRONMENTAL CONTROL CHAMBER DOWNSTREAM OF AN EXTRUSION DIE

[75] Inventors: James R. Cisar, Cuyahoga Falls, Ohio; Attila Grauzer, Akron, both of Ohio

[73] Assignee: U.C. Industries, Tallmadge, Ohio

[21] Appl. No.: 422,679

[22] Filed: Sep. 24, 1982

[51] Int. Cl.³ ............................................... B29D 27/00
[52] U.S. Cl. .................................. 264/40.1; 264/40.4; 264/51; 264/101; 425/141; 425/817 C
[58] Field of Search .................. 264/40.1, 40.4, 46.1, 264/101, 51; 425/141, 817 C

[56] References Cited

U.S. PATENT DOCUMENTS

| | | | |
|---|---|---|---|
| 2,566,854 | 9/1951 | Rhodes | 425/141 X |
| 2,576,317 | 11/1951 | Toulmin, Jr. | 425/141 |
| 3,024,404 | 3/1962 | Ziffer | 425/141 X |
| 3,474,160 | 10/1969 | Doering | 264/40.4 X |
| 3,775,035 | 11/1973 | Scotto et al. | 425/141 |
| 3,892,043 | 7/1975 | Bonikowski | 264/40.1 X |
| 3,922,328 | 11/1975 | Johnson | 264/46.1 |
| 4,087,499 | 5/1978 | Bayonnet | 264/40.4 X |
| 4,157,503 | 6/1979 | Brunner | 264/40.1 X |
| 4,199,310 | 4/1980 | Phipps | 425/71 |
| 4,211,739 | 7/1980 | Phipps | 264/101 X |
| 4,234,529 | 11/1980 | Phipps | 264/51 |
| 4,247,276 | 1/1981 | Phipps | 264/101 X |

FOREIGN PATENT DOCUMENTS 2444470  4/1976  Fed. Rep. of Germany ...... 425/141

*Primary Examiner*—Philip E. Anderson
*Attorney, Agent, or Firm*—Maky, Renner, Otto & Boisselle

[57] ABSTRACT

An apparatus adapted to be positioned downstream of a foam extrusion die in an environmental control or vacuum chamber for remote monitoring of the thickness and profile of foam boards, planks and like extrudates soon after the extrudate exits the die and takes its final shape, is characterized by opposed, relatively narrow shoes on opposite sides of the extrudate path and respective carriages therefor which together are movable transversely with respect to the extrudate path by respective worms and translating nuts and a common worm drive. One shoe is operative to support the bottom surface of the extrudate in a predetermined position while the other shoe rides on the extrudate and is position monitored by a transducer operative then to provide an output signal representative of the spacing between the shoes, and thus the thickness of the extrudate passing between the shoes, to remote monitoring circuitry located outside of the vacuum chamber. Through operation of the common worm drive, extrudate thickness is measured at points along the width of the extrudate for overall thickness and profile monitoring. Quick and responsive die adjustments then are made in response to immediate readout of product thickness and profile data thereby to minimize off-specification or scrap product. Provision also is made for pivoting one of the shoes and respective carriage clear of the extrudate path such as in the case of a jam-up.

55 Claims, 2 Drawing Figures

METHOD AND APPARATUS FOR MONITORING THE THICKNESS OF A FOAMED EXTRUDATE IN AN ENVIRONMENTAL CONTROL CHAMBER DOWNSTREAM OF AN EXTRUSION DIE

The present invention relates, in particular, to an apparatus useful for remote monitoring of the thickness and profile of extruded foam boards, planks and like products soon after the foaming extrudate leaves an extrusion die and takes it final shape within an environmental control or vacuum chamber. The apparatus also may be used in other applications to make thickness and profile measurements of relatively wide, longitudinally moving boards, planks and like products. Also, the invention relates to a control system or method wherein quick and responsive die adjustments immediately can be made to bring or maintain desired thickness and profile of vacuum extruded foam products with only a minimum of off-specification or scrap product having to be run.

BACKGROUND

As is known, the formation of extruded foam products in the form of boards, planks and the like is enhanced by the employment of a vacuum chamber so that the expansion of the foaming material exiting an extrusion die takes place under sub-atmosphere pressure. To this end and because of the delicate and fragile nature of the extruded foam, foam extrusion lines have employed an inclined barometric leg of substantial length which, at its upper end, defines a vacuum chamber into which the foaming material is extruded and formed to its final shape before it is guided by a conveyor along the length of the barometric leg. At its lower end, the barometric leg extends at a shallow angle into a pool of water, and the conveyor continues through a large radius in the pool to guide the foam extrudate through and from the pool for further processing, such as cutting to size and length. In a full size extrusion line, the barometric leg may be more than 50 meters in length and the large radius portion of the conveyor in the pool may be more than 30 meters in length. Accordingly, the foam extrudate may have a length of more than 80 meters by the time the lead end thereof exits the pool.

Because the extruded product generally assumes a cross-section different than that of the die orifice through which it is extruded, extrusion dies advantageously have employed two spaced, adjustable die lips which together define therebetween an elongated, axially outwardly extending arcuate die orifice through which the foaming material moves both laterally and axially outwardly relative to the die lips. Since the die lips necessarily are located inside the vacuum chamber and thus inaccessible during extrusion, provision has been made for remotely adjusting the die lips from outside the vacuum chamber. The purpose of adjusting is to vary the size and shape of the die orifice which controls to a substantial degree the thickness and profile of the extruded product.

In order properly to adjust the extrusion die, thickness and profile measurements of the extruded foam must be made after the foam has taken its final shape. Heretofore, the measurements were taken after the foam product could be gotten to upon exiting the pool at the end of the barometric leg. As a result, a substantial length of off-specification or scrap product, such as more than 80 meters as indicated above, would have to be run before measurements were taken and the extrusion die adjusted accordingly. Moreover, the results of any adjustment would not be determined until an additional substantial length of product was run and measurements taken some five to twenty minutes later. Such procedure, needless to say, results in substantial scrap and lost time.

SUMMARY OF THE INVENTION

An apparatus according to the present invention provides for remote monitoring of the thickness and profile of relatively wide, longitudinally moving products such as boards, planks and the like. In foam extrusion lines, the apparatus may be positioned in an environmental control or vacuum chamber to provide for immediate remote monitoring of the thickness and profile of an extrudate soon after it exits the extrusion die and takes its final shape, thus permitting extrusion die changes and corrections to be quickly and responsively made with the result that any off-specification or scrap product is of minimum length.

Briefly, the apparatus comprises a pair of opposed, relatively narrow, members or shoes on opposite sides of the path of the longitudinally moving product. Provision is made for engaging the shoes with opposite sides of the product and the spacing between the shoes, which is then dictated by the thickness of the product passing therebetween, is monitored by a transducer which provides an output signal representative of such spacing and thus product thickness to remote monitoring circuitry. For overall product thickness and profile monitoring, the shoes are movable transversely with respect to the product path and maintained in opposition for product thickness measurement at points along the width of the product.

More particularly, the shoes respectively are mounted above and below the product path on respective carriages which in turn are mounted on respective beams for transverse movement with respect to the product path. Trapped in the carriages are respective translating nuts which are in mesh with respective screws or worms. The worms are journaled between side plates straddling the product path and are uniformly driven by a common drive to effect uniform transverse movement of the carriages and shoes. Also, the beam for the lower carriage is fixed between the side plates whereas the upper beam is fixed between pivot plate which are pivotally supported on the ends of the upper worm whereby the upper beam, carriage and shoe may be swung away from the product path as in the case of jam-ups.

As indicated, the upper and lower shoes are maintained in opposition during transverse movement thereof along the width of the product path. Moreover, the lower show is operative to support the bottom surface of the product passing thereover at a predetermined position while the upper shoe rides on and tracks the top surface of the product passing therebeneath. Accordingly, the position of the upper tracking shoe will be dictated by the thickness of the product passing between the shoes and such position is monitored by a linear variable displacement transformer which provides an electrical output signal representative of monitored upper shoe position to remote monitoring circuitry. As the relative position of the lower shoe is fixed, the electrical output signal then, of course, likewise would be representative of shoe spacing and, more importantly, the thickness of the product passing between the shoes. By transversely moving the shoes to points along the width of the product path, data indicative of overall product thickness and profile can be obtained. In the case of a foam extrusion line wherein the extrusion die and shoes are located within an environmental control or vacuum chamber, the monitoring circuitry as in the form of a display may be located outside of the vacuum chamber in close proximity to remote adjustment devices for the extrusion die whereby quick and responsive die adjustments can be made in response to immediate readout of product thickness data whereby any off-specification or scrap product is of minimum length.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principals of the invention may be employed.

DETAILED DESCRIPTION

Figure 1:
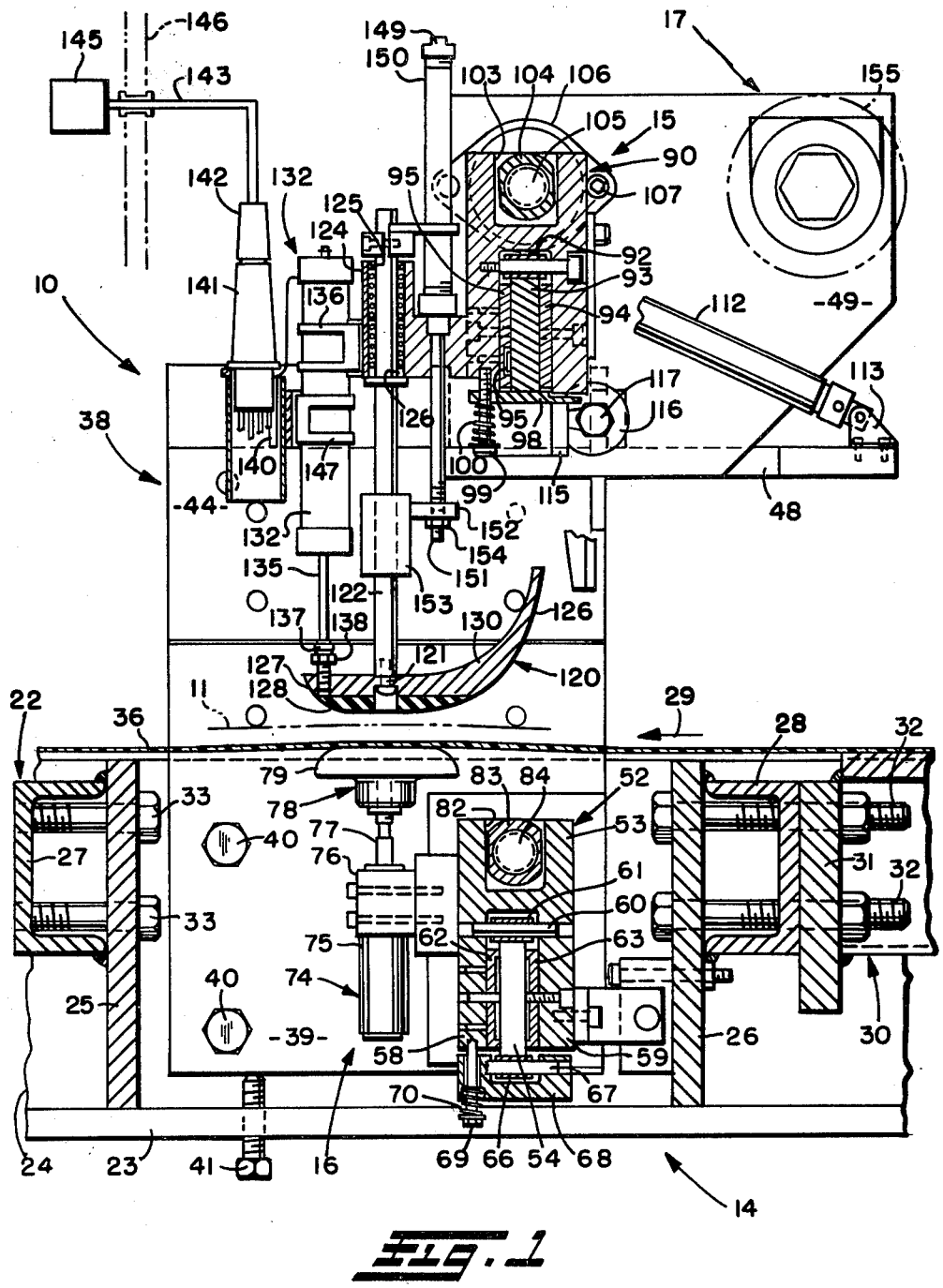
FIG. 1 is a vertical section through an apparatus according to the invention, such being taken longitudinally in relation to the path of foam extrudate passing through the apparatus.

Referring now in detail to the drawings, an apparatus according to the invention is designated generally by reference numeral 10. The apparatus 10 has particular application in foam extrusion lines of the type disclosed in U.S. Pat. No. 4,199,310, issued Apr. 22, 1980 and entitled "Extrusion Apparatus", wherein an environmental control or expansion chamber is defined by the upper end of an inclined barometric leg. The apparatus is adapted to be positioned in such vacuum chamber just down-stream of the extrusion die and any apparatus that may be employed to shape and form the foaming material exiting the die to its final thickness and profile. Moreover, the apparatus would be positioned downstream of the point at which the extrudate takes its final shape, this typically being a few feet, e.g., approximately eight feet, from the extrusion die. It also is noted that the apparatus, as illustrated, preferably would be oriented at right angles to the extrudate path shown in phantom lines in FIG. 1 at 11, which path may be inclined to the horizontal as for passage through the aforementioned inclined barometric leg. For an illustration of a type of shaping and forming apparatus that may be employed in an extrusion line of this type, reference may be had to applicants' assignee's U.S. Pat. No. 4,234,529, issued Nov. 18, 1980 and entitled "Method and Apparatus for Shaping Plastic Foams".

The apparatus, as illustrated, generally comprises a frame structure 14, upper and lower shoe and carriage assemblies 15 and 16 on opposite sides of the extrudate path 11, and a common carriage drive 17. These components and their interrelationship are described below along with the operation of the apparatus.

THE FRAME STRUCTURE

Figure 2:
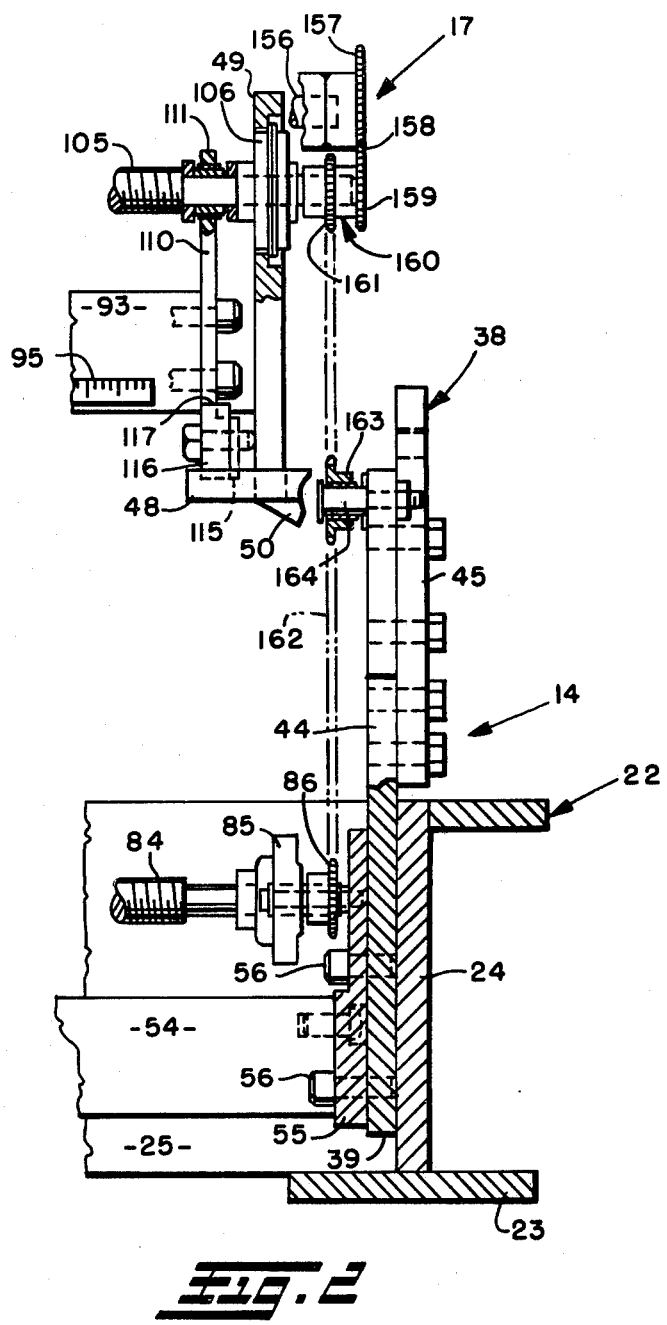
FIG. 2 is a fragmentary vertical section through one side of the apparatus of FIG. 1, taken transversely in relation to the extrudate path.

As seen in FIGS. 1 and 2, the frame structure 14 includes a mounting frame 22 generally disposed below the extrudate path 11. The mounting frame includes, at each side thereof, a relatively narrow bottom or foot plate 23 secured to the lower edge of a vertical mounting frame side plate 24. Each mounting frame side plate 24 is interconnected to the other by transversely extending, vertical plates 25 and 26 to which are secured transversely extending channels 27 and 28, respectively. The channels 27 and 28 respectively project forwardly and rearwardly of the vertical plates 25 and 26 (in relation to the passage direction of the extrudate indicated by arrow 29) for butted engagement with transversely extending end plates of downstream and upstream conveyor sections. In FIG. 1, only a portion of the upstream conveyor section can be seen at 30. As also seen in FIG. 1, the downstream end plate 31 of the conveyor section 30 is secured in butted engagement with the closed end of the channel 28 by fasteners 32. In like manner, the upstream end of the downstream conveyor section may be secured to the channel 27 by fasteners 33.

Extending the length of the upstream conveyor section 30 and also the downstream conveyor section is a flexible slide sheet 36 which accordingly spans the horizontal space or gap between the conveyor sections as seen in FIG. 1. The slide sheet 36 is supported on the horizontal top plate of each conveyor section and provides a relatively friction-free conveyor surface for the longitudinally moving extrudate as well as a degree of continuity of support for the extrudate as it passes between the conveyor sections. Accordingly, the slide sheet preferably is made of a material having non-stick properties in relation to the extrudate, such material being a fluorocarbon polymer sold under the trademark TEFLON by Du Pont de Nemours, E. I. & Co., for example. Of course, the slide sheet should have a width at least as great as that of the extrudate.

The frame structure 14 also includes at each side thereof an upstanding side plate or, more accurately, side plate assembly 38 which extends vertically above the mounting frame 22, and along with the other, straddles the extrudate path 11. Each side plate assembly 38 includes a vertical lower carriage mounting plate 39 which is accomodated between the transversely extending plates 25 and 26 and is secured to the inside of the respective mounting frame side plate 24 by fasteners 40. The fasteners 40 may extend through vertically elongated slots in each lower carriage mounting plate 39 so that each such plate may be height adjusted and leveled such as by means of adjusting screws provided in the respective bottom plate 23. In FIG. 1, a representative adjusting screw can be seen at 41.

Each side plate assembly 38 also includes an upper side plate 44 which resides in the same vertical plane as the respective lower carriage mounting plate 39 and is coupled thereto by a tie plate 45. For a reason that will become more apparent below, the upper side plate 44 may be coupled to the lower carriage mounting plate 39 in either one of two vertical height positions. For this, there are provided three vertically spaced rows of holes in the tie plate, the uppermost two or lowermost two of which selectively may be aligned with two vertically spaced rows of holes in the upper side plate.

At best seen in FIG. 2, the upper side plate 44 supports in cantilevered manner a vertical continuation of the side plate assembly 38 which consists of an inwardly projecting horizontal end plate 48 and a vertical, upper carriage mounting plate 49. For rigidity, a gusset 50 is secured to the underside of each horizontal end plate 48 and inside of the upper side plate 44.

THE LOWER SHOE AND CARRIAGE ASSEMBLY

Referring now to the lower shoe and carriage assembly 16, the carriage 52 thereof can be seen in FIG. 1 to include an inverted U-shape body 53 which rides on a beam or rail 54 for transverse movement with respect to the extrudate path 11. The beam 54 accordingly extends transversely and is secured at each end thereof to the respective lower carriage mounting plate 39 by a journal plate 55 and fasteners 56 as seen in FIG. 2.

As also seen in FIG. 1, the beam 54 is received in the bight of the inverted U-shape body 53 which has downwardly extending legs 58 and 59 disposed on opposite sides of the beam. Journaled between such legs on pins 60 at the upper end of the bight are transversely spaced roller bearings 61 which support the body for rolling or riding movement on the top edge of the beam. Also provided are C-shaped slide plates 62 and 63 which are secured to the insides of the legs 58 and 59 with their upper and lower short legs extending into top and bottom bearing engagement with opposite sides of the beam. Accordingly, the body is held to the beam against longitudinal pivotal or canting movement with respect to the beam axis.

The carriage body 53 also is stabilized on the beam 54 by transversely spaced roller bearings 66 which are held in tensioned riding engagement with the bottom edge of the beam. As seen in FIG. 1, each roller bearing 66 is journaled on a pin 67 between the upwardly extending legs of a U-shaped tension plate 68 which is mounted to the lower end of the carriage body by guide bolts. A representative guide bolt is shown at 69 and it can be seen that a coil spring 70 provided thereon is interposed between the head of the bolt and tension plate for holding the upper and lower sets of roller bearings 61 and 66 in tensioned engagement with the top and bottom edges of the beam 54, respectively.

Still referring to FIG. 1, it can be seen that the carriage body 53 has mounted on one side thereof a vertically oriented, pneumatic piston-cylinder assembly 74. The cylinder 75 of such assembly is secured to the carriage body 53 by a clamp assembly 76 with the piston rod 77 thereof extending perpendicularly to the extrudate path 11. Secured on the top end of the piston rod 77 is a mushroom-shaped shoe or anvil 78 which, as shown, has the head 79 thereof disposed beneath the slide plate 36. As will be discussed further below, the piston-cylinder assembly 74 may be extended to urge the shoe 78 upwardly to its illustrated position supporting the slide plate 36, and thus the bottom surface of extrudate passing thereover, at a predetermined position. On the other hand, the piston-cylinder assembly may be retracted to clear the shoe from the slide plate such as for the hereinafter described transverse movement thereof relative to the extrudate path 11.

To effect such transverse movement of the lower shoe 78 which is relatively narrow in relation to the width of the extrudate path, the carriage body 53 has an upwardly opening slot 82 in which a translating nut 83 is transversely trapped and held against rotation. The nut is in mesh with a transversely extending screw or worm 84 which has each end journaled in a respective bearing housing 85 secured to the adjacent, aforementioned journal plate 55. As seen in FIG. 2, the bearing housing 85 at at least one end of the worm 84 is spaced inwardly from the journal plate 55 to accomodate a driven sprocket 86 keyed or otherwise fixed to the projecting end of the worm. As will be discussed further below, the sprocket 86 is in vertical line with other sprockets of the common drive assembly 17.

THE UPPER SHOE AND CARRIAGE ASSEMBLY

As seen in FIG. 1, the carriage 90 of the upper shoe and carriage assembly 15 includes a carriage body 91 generally similar in construction to the lower carriage body 53. The upper carriage body 91 is of inverted U-shape and rides by means of transversely spaced roller bearings 92 on the top edge of a transversely extending beam 93. Secured to the insides of the depending legs of the carriage body 91 are slide plates 94 and 95 which are in bearing engagement with opposite sides of the beam. It is noted that here the slide plates 94 and 95 are of a rectangular shape for greater bearing support of the carriage 90 on the beam 93 which may be swung about a horizontal axis in the manner hereinafter discussed. As also seen in FIG. 1, the slide plate 95 is provided with a transversely extending slot in the beam bearing surface thereof which accomodates a transversely extending scale or ruler 95 secured to the beam, such scale 95 being useful in determining the transverse location of the carriage 90 along the beam and thus with respect to the width of the extrudate path 11.

The upper carriage 90, as shown, also differs from the lower carriage 52 by provision of a different form of transversely extending tension plate 98 mounted to the bottom of the carriage body 91 by guide bolts. A representative guide bolt is indicated at 99 in FIG. 1 and it can be seen that a coil spring 100 concentric therewith is interposed between the head of the bolt and tension plate for holding the tension plate and roller bearings 92 in tensioned engagement with the bottom and top edges of the beam, respectively. Like the lower carriage 52, the upper carriage 90 is held stabilized on the beam while being transversely movable therealong.

Transverse movement of the upper carriage 90 is effected similarly to that of the lower carriage 52, there being provided an upwardly opening slot 103 in the carriage body 91 in which a translating nut 104 is transversely trapped and held against rotation. The nut 104 is in mesh with a transversely extending screw or worm 105 journaled at each end in a respective bearing housing 106. The bearing housing 106 is secured by fasteners 107 to the upper end of the respective upper carriage mounting plate 49.

As seen in FIG. 2, the upper beam 93 is secured at each end thereof to a respective pivot plate 110 which is pivotally mounted at its upper end on the adjacent end of the worm 105 by a journal bearing assembly 111. Accordingly, the pivot plate 110 and thus the beam 93 and carriage 90 thereon can be swung as by a piston-cylinder assembly 112 (FIG. 1) about the worm axis to an elevated position away from the extrudate path 11 as in the case of a jam-up.

The piston-cylinder assembly 112 may have its blind end mounted by a clevis 113 to the horizontal plate 48 as shown in FIG. 1 and its rod end pivotally connected to the beam 93 or adjacent pivot plate 110 at a suitable location displaced from the swing axis, i.e., the axis of the worm 105. Under normal operative conditions, however, the piston-cylinder assembly 112 will be retracted to permit the carriage to swing downwardly to its position shown in FIG. 1 whereupon a longitudinally projecting flange 115 on the lower end of each pivot plate will engage the pole face of a horseshoe magnet 116 or other suitable magnet. The magnet may be secured by a fastener 117 to the upper carriage mounting plate 49 and serves to hold the upper carriage in its operative position after the piston-cylinder assembly 112 has been deenergized.

When the upper carriage 90 is in its illustrated operative position, an upper tracking shoe 120 carried thereby is movable towards and away from the extrudate path 11. As seen in FIG. 1, the upper shoe is secured by a button fastener 121 to the lower end of a slide rod 122 which is guided for axial movement by ball bushings 123 in a mounting block 124 on one side of the carriage body 91. The ball bushings 123, as shown, are retained in a bore in such mounting block 124 by end retainers 125 and 126.

The upper or tracking shoe 120 has a stubby ski-shape, i.e., an upwardly arcing bumper end 126 on opposite curved end 127. Preferably, the shoe 120 is of the illustrated two-piece construction with the bottom piece 128 thereof being made of a non-stick material such as ultra-high molecular weight polyethylene. The bottom piece 128 of the shoe further has a central planar bottom face 129 adapted to ride on the top surface of the extrudate passing therebeneath. The top piece 130 may be made of metal.

The weight of the upper shoe 120 and components fixed thereto normally will be sufficient to maintain tracking engagement of the shoe with the top surface of the extrudate without scoring or crushing the extrudate. However, other means may be provided to float the shoe while urging the same under controlled pressure against the extrudate to maintain such tracking without scoring or crush.

The position of the upper shoe 120 as it rides on the upper surface of the extrudate is monitored by a transducer 132. The transducer 132 shown is a linear variable differential transformer (LVDT) which includes a housing 134 for a stationary coil and an armature 135 that moves within the hollow core of the stationary coil. As is conventional, the coil has a primary winding in the middle, and two secondaries, wired in series opposition. When the primary coil is energized, the armature 135, made of magnetic material, induces a voltage from the primary to the secondary windings. The position of the armature within the core of the stationary coil determines the level of the voltage at each secondary winding. If the armature is placed precisely midway between the two secondary windings (null position), the induced voltage in each secondary winding is equal and opposite, and there is no output. But as the armature is moved in either direction away from null position, the LVDT produces an output voltage that is proportional to the displacement of the armature from such null position and whose phase relationship with the primary supply shows whether the armature has moved nearer one end or the other of the coil. Thus, for each position of the armature, there is a definite output voltage, different in level and polarity than for any other position, no matter how slight the difference.

As seen in FIG. 1, the coil housing 134 of the LVDT 132 is secured by a clamp assembly 136 to the end of the shoe mounting block 124 with the armature 135 extending downwardly and parallel to the slide rod 122. At its bottom end, the armature 135 has a button head 137 which engages the head of an adjustable screw 138 threaded into the upper piece 130 of the upper shoe 120. Fine adjustments may be made by the adjustment screw 138 for zeroing the LVDT whereas major adjustments may be made by adjusting the coil housing 134 in the clamp assembly 136.

It thus can be seen that movement of the upper tracking shoe 120 will effect corresponding movement of the LVDT armature 135. As a result, the LVDT 132 will provide an electrical output signal representative of the monitored position of the upper tracking shoe. Such signal may be transmitted via lead wires 140, a receptacle 141, plug 142 and lead wires 143 to remote monitoring circuitry. In the case of a vacuum extrusion line, sensed positions of the upper tracking shoe may be remotely displayed as by a meter 45 located outside the vacuum chamber 146, which meter may be located in close proximity to remote adjustment devices for the extrusion die. As seen in FIG. 1, the receptacle 141 may be mounted in a holder 147 conveniently clamped to the coil housing 134 of the LVDT 132.

In order to permit transverse movement of the tracking shoe 120 to different points along the width of the extrudate without the possibility of scoring or marring the top surface of the extrudate, a piston-cylinder assembly 149 is provided for moving the shoe away from the extrudate path. The cylinder 150 of such assembly is mounted on the shoe mounting block 124 with its piston rod 151 extending downwardly through the mounting block and parallel to the slide rod 122. At its bottom end, the piston rod extends through an oversized hole in a stop plate 152 secured by a coupling 153 to the slide rod 122. Threaded on the bottom end of the piston rod is a jam nut 154 adapted to engage the underside of the stop plate upon retraction of the piston-cylinder assembly for lifting of the shoe away from the extrudate path as shown.

THE COMMON DRIVE ASSEMBLY

The remaining general component of the illustrated apparatus is the common drive assembly 17 which includes an air motor 155 mounted on the upper carriage support plate 49 at one side of the apparatus. The drive shaft 156 of the motor extends transversely and has a drive sprocket 157 keyed or otherwise secured thereon as seen in FIG. 2. Trained about the drive sprocket 157 is a chain 158 which in turn is trained about a driven sprocket 159 of a sprocket assembly 160 keyed or otherwise secured on the adjacent end of the upper carriage worm 105. The sprocket assembly 160 further has a drive sprocket 161 in vertical line with the aforementioned driven sprocket 86 on the lower carriage worm 84. A drive chain 162 is trained about such drive sprocket 161 and driven sprocket 86 for effecting, rotation of the lower carriage worm 84 along with the upper carriage worm 105. As desired, one or more idler sprockets 163 may be provided, each being journaled, for example, on a stub shaft 164 secured to the upper side plate 44. In view of the foregoing, operation of the motor 155 will effect uniform rotation of the carriage worms 84 and 105 in the same direction, it further being noted that the worms are of like pitch and like handed. Such uniform rotation in turn will effect uniform movement of the lower and upper carriages 52 and 90 transversely with respect to the extrudate path 11. Accordingly, rotation of the worms in either direction will move the carriages in the same direction to the same extent. In this manner, the upper and lower shoes 120 and 78 mounted on the carriages will be maintained in opposition on opposite sides of the extrudate path as they together move to different points along the width of the extrudate path.

OPERATION

The operation of the apparatus 10 for monitoring the thickness and profile of extrudates and other products moving longitudinally therethrough will now be described. Initially, the lower and upper shoes 78 and 120 may be moved away from the extrudate path 11 by the respective piston-cylinder assemblies 74 and 149 until a length of extrudate passes therebetween. Then the piston-cylinder assembly 74 may be extended to move the lower shoe 78 into operative supporting engagement with the bottom surface of the extrudate via the slide plate 36 and further to locate the bottom surface of the extrudate at a predetermined position. Preferably, the lower shoe when elevated places a slight positive crown in the slide plate as indicated to insure operative engagement with the bottom surface of the extrudate which otherwise is supported on the upstream and downstream conveyor sections. That is, the top of the crown will be offset above the common plane of the extrudate supporting surfaces of the conveyors.

Also, the upper tracking shoe 120 may be lowered onto the top surface of the extrudate by extension of the piston-cylinder assembly 145. As the extrudate passes therebeneath, the upper shoe will ride on and track the upper surface of the extrudate. Accordingly, the position of the upper shoe will be dictated by the thickness of the product passing between the shoes. As the lower shoe is held in a known position, the position of the upper shoe will be indicative of the shoe spacing and, more importantly, the product thickness. Accordingly, the transducer monitoring the position of the upper shoe will provide an output signal representative of the product thickness passing between the opposed shoes. Suitable calibration may be made to provide a direct reading of the product thickness at the meter 145, for example.

For overall product thickness and profile monitoring, the upper and lower shoes 120 and 78 are moved to points along the width of the extrudate path, such being effected by operation of the common drive 17. Preferably, each shoe, and particularly the upper shoe, is moved out of engagement with the extrudate so as to avoid scoring or marring of the extrudate surfaces as the shoes are transversely moved from point to point. The shoes, however, may be left in any position to read continuously the thickness of the product at such position thereby to indicate any in-line or lengthwise changes in thickness which may be caused by varying process conditions.

In the case of a vacuum extrusion line, the apparatus ideally, as above indicated, is located within the vacuum chamber 146 downstream of the extrusion die and the point at which the extrudate takes its final shape. The display 145 and/or other monitoring circuitry however is located outside the vacuum chamber and thus provides immediate read-out of product thickness data outside of such chamber for use in connection with extrusion die adjustments and then product monitoring once desired product thickness and profile has been obtained. As product thickness and profile measurements are taken soon after the extrudate exits the die and takes its final shape, no longer is it necessary to run relatively long lengths of off-specification or scrap product as in the past. Instead, quick and responsive die adjustments can be made in response to immediate read-out of product thickness data. To further facilitate accurate and responsive die adjustments, the subject apparatus may be used along with that described and shown in applicants' assignee's copending U.S. patent application entitled "Foam Extrusion Die and Monitoring Apparatus", filed even date herewith and assigned Ser. No. 422,678.

Although the illustrated apparatus is designed for use inside an environmental control or vacuum chamber, apparatus according to the invention may find application elsewhere such as in atmospheric extrusion lines. Moreover, the illustrated design is suited to monitor products which are $\frac{1}{2}$" to 4" thick, but may be easily modified for use in monitoring products of virtually any thickness. In the illustrated apparatus, for example, provision is made for monitoring a wide range of product thicknesses as by coupling the upper side plate 44 to the lower carriage mounting plate 39 in either one of two vertical height positions.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

The embodiments of the invention in which an exclusive property or privilege is claimed are defined as follows:

1. A foam extrusion control method comprising the steps of:
   (a) operatively engaging a pair of opposed shoes against respective opposite side surfaces of a foam extrudate exiting an extrusion die at or just downstream of the point at which the extrudate takes its final shape in a vacuum chamber;
   (b) allowing at least one of the shoes to move towards and away from the other in response to variations in the thickness of the extrudate passing therebetween;
   (c) using transducer means operatively connected to said shoes to provide an output signal representative of relative shoe positions and thus the thickness of the extrudate passing therebetween;
   (d) supplying such output signal to monitoring circuitry providing a corresponding readout of product thickness data outside the vacuum chamber; and then
   (e) making immediate and responsive extrusion die adjustments by means of remote die adjustment devices located outside the vacuum chamber as needed to bring or maintain desired extrudate thickness.

2. A method as set forth in claim 1 further comprising the step of transversely moving the shoes with respect to the extrudate path for monitoring thickness at points along the width of the extrudate thereby to obtain readout of overall product thickness and profile data.

3. A method as set forth in claim 2 wherein such other shoe is used to support the bottom surface of the extrudate passing thereover at a predetermined position while such one shoe rides on the top surface of the extrudate.

4. A method as set forth in claim 3 wherein a linear variable differential transformer is used as the transducer means for providing an electrical output signal representative of the position of such one shoe.

5. A method as set forth in claim 2 further comprising the step of supporting the extrudate both upstream and downstream of the shoes on conveyor surfaces which are slightly offset below a plane extending parallel thereto and through such predetermined position.

6. In a foam extrusion apparatus including an environmental control chamber and an extrusion die within the chamber, an extrudate thickness monitoring device adapted to be positioned downstream of the extrusion die within the chamber, said device comprising a pair of opposed members, means for operatively engaging said members with respective opposite side surfaces of the extrudate exiting the extrusion die with at least one of said members being movable towards and away from the other in response to variations in thickness of the extrudate passing therebetween, and means for monitoring the spacing between said members and thus the thickness of the extrudate passing therebetween, said one and other of said members respectively including upper and lower shoes, said lower shoe being operative to support the bottom surface of the extrudate passing thereover at a predetermined position while said upper shoe rides on the top surface of the extrudate.

7. An apparatus as set forth in claim 6 wherein said means for monitoring provides an output signal representative of monitored thickness.

8. An apparatus as set forth in claim 7 wherein means are provided for transmitting such output signal to remote monitoring circuitry located outside the environmental control chamber.

9. An apparatus as set forth in claim 8 wherein said remote monitoring circuitry is located in close proximity to remote adjustment devices for the extrusion die whereby quick and responsive die adjustments can be made in response to immediate readout of extrudate thickness data.

10. An apparatus as set forth in claim 9 wherein said opposed members are positioned at or just downstream of the point at which the extrudate takes its final shape.

11. An apparatus as set forth in claim 6 wherein said members are transversely narrow in relation to the width of the extrudate, and means are provided for moving said members transversely with respect to the extrudate path for monitoring thickness at points along the width of the extrudate, said members being maintained in opposition at each such point.

12. An apparatus as set forth in claim 11 wherein said members are uniformly transversely moved between such points.

13. An apparatus as set forth in claim 11 wherein means are provided for disengaging said members from the product for transverse movement between such points.

14. An apparatus as set forth in claim 6 wherein the effective extrudate engaging surfaces of said members have a planar area sufficient in size to prevent scoring of the extrudate.

15. An apparatus as set forth in claim 6 wherein the effective extrudate engaging surfaces of said members are made of a non-stick material in relation to the extrudate.

16. An apparatus as set forth in claim 6 wherein said one and other of said members respectively include upper and lower shoes, said lower shoe being operative to support the bottom surface of the extrudate passing thereover at a predetermined position while said upper shoe rides on the top surface of the extrudate.

17. An apparatus as set forth in claim 6 wherein said means for monitoring includes transducer means operatively connected to said upper shoe for providing an output signal representative of upper shoe position.

18. An apparatus as set forth in claim 6 wherein said means for monitoring includes a linear variable differential transformer operatively connected to said upper shoe for providing an electrical output signal representative of upper shoe position.

19. An apparatus as set forth in claim 6 including extrudate conveyors located just upstream and downstream of said shoes, and a flexible slide sheet for the extrudate supported on said conveyors and spanning the gap therebetween above said lower shoe.

20. An apparatus as set forth in claim 19 including means for moving said lower shoe upwardly to engage said slide sheet and impart a slight upward crown thereto so that the top of the crown supports the bottom surface of the extrudate passing thereover at such predetermined position.

21. An apparatus for monitoring the thickness and profile of a relatively wide, longitudinally moving product such as a board or plank, comprising a pair of opposed shoes which are transversely narrow in relation to the width of the product, means for operatively engaging said shoes with respective opposite side surfaces of the product with at least one of said shoes being movable towards and away from the other in response to variations in thickness of the product passing therebetween, means for monitoring the spacing between said shoes and thus the thickness of the product passing therebetween, and means for moving said shoes transversely with respect to the product path for monitoring thickness at points along the width of the product and thus the profile of the product.

22. An apparatus as set forth in claim 21 wherein said one and other shoes respectively are upper and lower shoes disposed above and below the product path, said lower shoe being operative to support the bottom surface of the product passing thereover at a predetermined position while said upper shoe rides on the top surface of the product.

23. An apparatus as set forth in claim 22 wherein said means for monitoring includes transducer means operatively connected to said upper shoe for providing an output signal representative of upper shoe position.

24. An apparatus as set forth in claim 23 wherein upper and lower carriages respectively are provided for said upper and lower shoes, and means are provided for mounting said carriages for transverse movement with respect to the product path.

25. An apparatus as set forth in claim 24 wherein said means for mounting includes upper and lower transversely extending beams disposed above and below the product path, said upper and lower carriages respectively being mounted on said upper and lower beams for movement therealong.

26. An apparatus as set forth in claim 25 wherein said carriages include roller means by which such carriages ride on respective said beams.

27. An apparatus as set forth in claim 26 wherein said carriages are each of inverted U-shape in cross-section, and said beams and roller means are received in the bights of respective said carriages.

28. An apparatus as set forth in claim 27 wherein means are provided for resiliently holding said roller means in rolling engagement with the top edge of said beams.

29. An apparatus as set forth in claim 28 wherein said means for resiliently urging includes bearing means mounted on said carriages and spring loaded into bearing engagement with the bottom edge of said beams.

30. An apparatus as set forth in claim 27 wherein the bight of each carriage is defined by depending legs thereof, and bearing plates are secured to the insides of said legs for bearing engagement with opposite side surfaces of respective beams.

31. An apparatus as set forth in claim 25 wherein said means for moving effects uniform transverse movement of said carriages along said beams.

32. An apparatus as set forth in claim 31 wherein said means for moving includes respective nuts retained in said carriages and respective upper and lower worms in mesh with said nuts.

33. An apparatus as set forth in claim 32 including a pair of vertical side frame elements straddling the product path, said upper and lower worms respectively being journalled top and bottom between said side frame elements.

34. An apparatus as set forth in claim 23 wherein said frame elements includes upper and lower side plates between which said upper and lower beams are supported, and means for connecting each upper plate to a respective lower plate at one of at least two adjusted height positions whereby a wide range of product thicknesses may be monitored.

35. An apparatus as set forth in claim 33 wherein said upper beam is fixed between end plates pivotally supported on said upper worm, and means are provided for pivoting said beam, and thus the upper carriage and shoe mounted thereon, upwardly about the axis of said upper worm.

36. An apparatus as set forth in claim 33 wherein said lower beam is fixed between the lower ends of said side frame elements.

37. An apparatus as set forth in claim 33 wherein said side frame elements are mounted on respective opposite sides of a conveyor frame.

38. An apparatus as set forth in claim 37 including conveyor sections mounted on said conveyor frame upstream and downstream of said shoes, and a flexible slide sheet for the extrudate supported on said conveyor sections and spanning the gap therebetween above said lower shoe.

39. An apparatus as set forth in claim 37 including means on said lower carriage for moving said lower shoe upwardly to engage said slide sheet and impart a slight upward crown thereto so that the top of the crown supports the bottom surface of the product passing thereover at such predetermined position.

40. An apparatus as set forth in claim 30 including a common drive for said worms.

41. An apparatus as set forth in claim 24 wherein said upper shoe is mounted at the bottom end of a support element guided in said upper carriage for movement towards and away from the lower shoe.

42. An apparatus as set forth in claim 41 wherein said support element is a rod guided for axial movement in ball bushings retained in said upper carriage.

43. An apparatus as set forth in claim 42 including means for lifting said upper shoe away from the product.

44. An apparatus as set forth in claim 42 wherein said means for monitoring includes a linear variable differential transformer including an armature and a coil housing, and means are provided to mount said coil housing on said upper carriage with the armature extending parallel to said rod and downwardly into engagement with the top of said upper shoe.

45. An apparatus as set forth in claim 22 wherein said upper shoe has a bottom planar product engaging surface terminating at upwardly curved longitudinal ends.

46. An apparatus as set forth in claim 45 wherein said product engaging surface is made of ultra-high molecular weight polyethylene.

47. In combination with an extrusion line including a closed chamber and an extrusion die within said chamber, a monitor operative to read the thickness of extrudate exiting the die at a selected location within said closed chamber, and at points along the width of the extrudate and thus the profile of the extrudate.

48. A combination as set forth in claim 47 wherein such selected location is at or just downstream of the point at which the extrudate takes its final shape.

49. A combination as set forth in claim 47 wherein said monitor is inside said closed chamber and the readout is outside said chamber.

50. A combination as set forth in claim 49 wherein said monitor includes means operative to produce an output signal representative of extrudate thickness at such selected location, and means are provided for connecting said means to readout means located outside said chamber.

51. A combination as set forth in claim 47 wherein said monitor is operative to read extrudate thickness at points along the width of the extrudate and thus the profile of the extrudate.

52. A combination as set forth in claim 47 wherein said monitor includes opposed means in operative engagement with opposite side surfaces of the extrudate, at least one of said means being movable towards and away from the other in response to variations in the thickness of the extrudate passing therebetween.

53. A combination as set forth in claim 52 wherein said monitor includes transducer means operatively connected to said opposite means for providing an output signal representative of extrudate thickness, and means are provided for connecting said transducer means to readout means located outside said chamber.

54. A combination as set forth in claim 53 wherein said readout means includes a display located in the proximity of remote adjustment devices for said extrusion die.

55. A combination as set forth in claim 52 wherein means are provided for uniformly transversely moving said opposed means in relation to the extrudate path to read extrudate thickness at points along the width of the extrudate.

* * * * *